United States Patent [19]

Persinski et al.

[11] 3,768,565

[45] Oct. 30, 1973

[54] FRICTION REDUCING

[75] Inventors: Leonard John Persinski; Jerry Emile Boothe, both of Pittsburgh, Pa.

[73] Assignee: Calgon Corporation, Pittsburgh, Pa.

[22] Filed: Sept. 29, 1971

[21] Appl. No.: 184,896

[52] U.S. Cl..................... 166/308, 137/13, 166/271
[51] Int. Cl............................................. E21b 43/26
[58] Field of Search....................... 137/13; 166/271, 166/280, 305, 308; 252/855 R

[56] References Cited
UNITED STATES PATENTS 3,023,760  3/1962  Dever et al. ........................... 137/13

FOREIGN PATENTS OR APPLICATIONS 864,433  2/1971  Canada............................... 166/275

*Primary Examiner*—Marvin A. Champion
*Assistant Examiner*—Jack E. Ebel
*Attorney*—Rudolph J. Anderson et al.

[57] ABSTRACT

Polymers containing 2-acrylamido-2-methylpropane sulfonic acid are useful as friction reducers for aqueous fluids flowing through a conduit, especially for the aqueous hydraulic fracturing of subterranean formations.

5 Claims, No Drawings

3,768,565

FRICTION REDUCING

BACKGROUND OF THE INVENTION

This invention is directed to the art of reducing the energy loss during the flow of aqueous fluids through pipes. More particularly, our invention is directed to friction reduction in the aqueous hydraulic fracturing of subterranean formations. The aqueous fracturing fluid may be brine, fresh water, or acid. Our invention will also be useful in firefighting, hydraulic control systems, and in any other application where the energy loss of aqueous fluids flowing through a conduit is to be avoided.

It is well known that in the movement of aqueous fluids through conduits, friction is encountered and hence energy is lost. This energy loss is apparent from the pressure drop obtained in moving the fluid through a given distance and is directly proportional to the velocity of the fluid. According to the well-known laws of fluid dynamics, as long as the critical Reynolds Number of a fluid medium flowing through a conduit is not exceeded, the fluid moves in laminae which are actually aligned along the conduit. Under these conditions of laminar flow, the energy loss is minimal. However, when the velocity is greatly increased, the critical Reynolds Number is exceeded and turbulence occurs. This turbulence represents the change from laminar to nonlaminar flow. In addition, turbulence is increased by any irregularities in the conduit or in the entering or exiting formation which will distort the flow pattern. An increase in turbulence causes an increase in the amount of energy lost through friction.

In the art of producing oil or gas from a subterranean formation, it is well knwon that production can be greatly increased by hydraulically fracturing the formation. In a hydraulic fracturing operation, a fracturing fluid is forced down a well bore under high pressures to fracture the rock formation surrounding the well bore. The pressure is then released allowing the oil or gas to seep through the fractures into the well bore where it is then pumped to the surface.

In the hydraulic fracturing operation, a high velocity is required and extremely high pressure drops are encountered resulting in large losses of energy. In hydraulic fracturing, it is necessary to inject sufficient amounts of fracturing fluds to build up the required pressure in the well in order to effectuate cracks or fractures in the subterranean formation. Pressures as high as 3,000 to 10,000 psi measured at the surface, are often required. Because of the large quantites of fluid needed, the high velocities required, and the general irregularities of the formation, it is difficult to obtain satisfactory results in many fracturing operations because of the energy loss. Thus, a method for reducing this friction (energy) loss is greatly desirable.

It is, therefore, the principal object of this invention to provide a polymeric additive which reduces the friction loss in flowing aqueous fluids, especially the hydraulic fracturing of subterranean formations.

Most commonly, fresh water or aqueous brine are used as the fracturing medium in oil field operations. The brines usually contain from a few parts per million to high percentages of dissolved salts. In fact, oil field brines sometimes contain total dissolved solids of up to about 10 percent or higher. Particularly, common brines which are difficult to use with polymeric additives are those having dissolved alkaline earth metal salt concentrations of more than 1,000 ppm. Most oil field brines contain at least several hundred ppm of calcium in addition to 2 percent or more sodium chloride and potassium chloride.

In addition, it is also well known in the art of producing oil or gas from a subterranean formation that fluid production can occasionally be stimulated by injecting acid solutions into the formation by way of the well bore. This is especially true when the reservoir contains large amounts of carbonate rock such as limestone, dolomite, and the like. The acid reacts with the carbonate content of the rock, thereby creating channels in he rock between the reservoir and the well bore. This increases the effective drainage area of the well bore, stimulating production.

The most commonly used acid for this purpose is hydrochloric. However, other acids such as hydrofluoric, nitric, formic, acetic and sulfonic have also been highly successful in increasing production in calcareous formations. Mixtures of two or more different acids have also been used, especially mixtures containing hydrofluoric acid. The acids are usually employed as 1 percent to 35 percent by weight solutions in water. However, because of the scarcity of fresh water and economics, it is often necessary to employ oil field brine as the aqueous medium in place of water. In these cases, the aqueous medium will be an acidic brine.

Acidizing and hydraulic fracturing are generally combined into one treatment by employing an acidic fluid under hydraulic fracturing pressures. This combination treatment of the well is called acid fracturing and it stimulates production by obtaining the benefits of both the chemically created channels and the pressure created fractures. When acid fracturing, the aqueous fluid may be an acid solution or an acidic brine as described above.

It has become the common practice in the oil field art to add friction-reducing polymers to the fracturing fluids to reduce turbulence and subsequent energy loss as the fracturing fluid is forced from the surface into the subterranean formation. For example, see U. S. Pat. No. 3,023,760 which discloses the use of sodium polystyrene solfonate as a friction reducer and U. S. Pat. Nos. 3,102,548, 3,254,719 and 3,370,650 which disclose the use of polyacrylamides as friction reducers. In addition, see U. S. Pat. Nos. 3,451,480 and 3,537,525 which disclose the use of polymers containing diacetone acrylamide as friction reducers. Finally, see U. S. Pat. No. 3,562,226 which discloses the use of polymers containing dialkyl diallyl quaternary ammonium groups as friction reducers.

While most of these above-mentioned friction reducers are effective and have been somewhat of a success, many of them suffer from one or more drawbacks. For example, some of the polymers have a tendency to precipitate in the presence of the highly concentrated dissolved inorgainic salts. Some of the polymers are relatively unstable at the elevated temperatures found in most subterranean formations. In addition, the viscosities of many of the polymers are greatly decreased in the presence of brine or acid. It has been known for years that partially hydrolyzed polyacrylamide, when dissolved in pure water, forms a much more viscous solution than the unhydrolyzed polyacrylamides. However, most of this viscosity increase is lost in water containing high concentrations of dissolved inorganic salts and/or acids. This loss of viscosity seriously affects the friction-reducing properties of the polymer. Also, many of these prior art polymers are not shear stable, especially in the presence of dissolved inorganic salts and/or acids. Because of the extremely high velocities, it is important that the polymers be shear stable. Finally, many of the polymers are not as effective as desired and new and improved friction-reducing additives are always desirable. Moreover, none of the prior art compounds are effective in all of the different aqueous fracturing systems.

It is, therefore, an object of this invention to provide an improved friction reducer. It is a further object of this invention to provide a friction reducer that overcomes the defects of the prior art compounds.

SUMMARY OF THE INVENTION

We have found a series of polymeric friction reducers which are an improvement over the prior art compounds. The friction reducers of our invention are effective in fresh water, brines, and acidic fracturing fluids. In addition, they are temperature stable and shear stable. Finally, they are very effective at low concentrations. This combination of properties fulfills a long felt need by the art. The polymers of our invention are random, linear, high molecular weight water-soluble polymers containing at least 2.5 mole percent of 2-acrylamido-2-methyl-propane sulfonic acid. The polymers are represented by the structural formula:

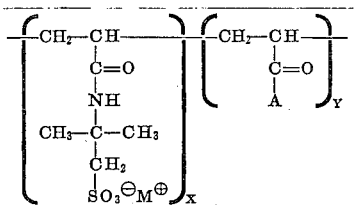

where "$M^+$" is hydrogen, ammonium, or alkali metal, preferably sodium or potassium; "A" is $-NH_2$ and/or $-O^- M^+$ such that $-NH_2$ is from 50 to 100 percent of the "A" groups; "X" is from about 2.5 mole percent to 100 mole percent and "Y" is from 0 to about 97.5 mole percent.

The polymers of our invention may be prepared by copolymerizing 2-acrylamido-2-methylpropane sulfonic acid or its water-soluble salt and acrylamide in the desired molar proportions. If carboxyl groups are desired, the resulting polymer may be hydrolyzed to the appropriate degree thus giving a polymer having the desired ratio of amide groups to carboxyl groups. Any of the well known methods of hydrolysis may be employed. However, we prefer the use of NaOH or KOH as the hydrolyzing agent. Alternatively, one may prepare polymers containing carboxyl groups by copolymerizing 2-acrylamido-2-methylpropane sulfonic acid or its water-soluble salt with acrylamide and acrylic acid (or methacrylic acid which is herein considered equivalent to acrylic acid) or its water-soluble salt. The polymerization may be carried out by using any of the well known free radical solution, suspension, or emulsion techniques. We prefer to use solution polymerization but have made suitable polymers using both emulsion and suspension techniques. However, any other suitable means may be employed for preparing the polymer as is recognized by one skilled in the art. Our invention is independent of the method of polymerization so long as it yields a polymer having the desired structure and molecular weight.

It is also within the scope of our invention to use polymers which are derived from monomers in addition to 2-acrylamido-2-methyl-propane sulfonic acid, acrylamide and acrylic acid. Our invention contemplates the use of up to about 20 mole percent of other water-soluble comonomers and up to about 10 mole percent of water-insoluble comonomers. Examples of some of the useful water-soluble comonomers are methacrylamide, methacrylic acid, the N lower alkyl substituted acrylamides and methacrylamides, diacetone acrylamide, alkali metal styrene sulfonates, and di lower alkyl diallyl ammonium chlorides. Examples of some of the water-insoluble comonomers are vinyl acetate, acrylonitrile, vinyl chloride, lower alkyl esters of acrylic and methacrylic acids and styrene. Therefore, while the polymers of our invention consist essentially of 2-acrylamido-2-methylpropane sulfonic acid, acrylamide and acrylic acid, they may also contain up to about 20 mole percent of other water-soluble comonomers and up to about 10 mole percent of water-insoluble comonomers and still be within the scope of our invention.

In addition, the polymers may be given somewhat of a branched or cross-linked structure by incorporating in the polymers a small amount of cross-linking agents. Examples of some of these useful compounds are triallyl amine, triallyl methyl ammonium chloride, tetraallyl ammonium chloride and N,N'-methylene bisacrylamide. These compounds should be present in concentrations which yield water-soluble polymers. Generally, this concentration will seldom exceed 0.1 mole percent. However, one skilled in the art would easily be able to determine the maximum concentration of a crosslinking agent that is tolerable.

The 2-acrylamido-2-methylpropane sulfonic acid polymers of our invention are not new and have been reported in the literature. For example, see Kaufman Canadian Pat. No. 864,433 which discloses the use of these types of polymers as waterflooding polymers. In addition, see Arlt et al U. S. Pat. No. 3,547,899 which discloses and claims the composition of 2-acrylamido-2-methylpropane sulfonic acid containing polymers. In addition, see U. S. Pat. Nos. 3,388,199; 3,332,904 and 3,506,707.

The polymers of our invention should have a molecular weight of at least 1,000,000. There is no reason to believe that there is a critical minimum molecular weight which must be achieved in order to show friction-reducing properties. A low molecular weight polymer will have a slight effect when compared to a high molecular weight polymer. However, for all practical purposes, it may be said that a molecular weight of at least 1,000,000 is necessary in order to achieve a commercially reasonable result. Also, there is no critical maximum molecular weight. Generally speaking, the higher the molecular weight the more effective the polymer. Therefore, polymers having molecular weights of 10 to 20 million or higher are desirable and preferred.

Similarly, there is no reason to believe that there is a critical minimum quantity which must be used to achieve a friction-reducing effect. A small amount will have a slight effect, but for all practical purposes, we have found that a minimum concentration of 50 ppm is necessary. The maximum amount used will largely be determined by economic considerations. However, concentrations greater than 1,000 ppm will seldom, if ever, be employed. In the majority of cases, a concentration of about 240 ppm will produce a commercially significant effect.

The polymers of our invention are effective in all of the common aqueous fluids used in hydraulic fracturing. They are effective in fresh water, highly concentrated oil field brines, and in the common acids used for acid fracturing such as hydrofluoric, hydrochloric, nitric, formic, acetic and sulfonic. In addition, they are also effective in a combination of two or more different acids and in a combination of the acids and oil field brines.

The fracturing fluids of our invention contain from about 50 ppm are commonly used in the fracturing process as is understood by one skilled in the art. Examples of some of these optional additives are corrosion inhibitors, propping agents, ahd fluid loss additives. to about 1,000 ppm of polymer based on the total weight of the fracturing fluid. In addition, the fracturing fluid may contain other additives which We have performed numerous experiments which demonstrate the effectiveness of our polymers in reducing friction in aqueous fracturing fluids. In these experiments, the polymers were tested for friction-reducing properties in a standard friction reduction loop. The friction reduction was calculated from pressure loss measurements taken on test materials passing through a tube of known length and diameter under known velocities. The degree of friction used as a base is that generated by an untreated fluid.

In the following examples and tables, the term "AS/AM" means the mole ratio of 2-acrylamido-2-methylpropane sulfonic acid to acrylamide. The term "Percent FR" means the percent friction reduction and is the percent the friction generated by the untreated fluid has been reduced by the polymer treatment.

EXAMPLE 1

The acid stability of a high molecular weight polymer of 2-acrylamido-2-methylpropane sulfonic acid was tested as follows. A 1 percent by weight solution of the polymer was made in 15 percent hydrochloric acid. The viscosity was then measured on a Fann Model 35 Viscometer over the entire R.P.M. range. The acidic solutions were then held for 24 hours and the viscosities determined again. All viscosity measurements were made at room temperature. The results are shown in Table 1.

TABLE 1

Acid Stability

Viscosity in Fann Units

| R.P.M. | Immediate | 24 Hours |
|---|---|---|
| 3 | 2 | 2 |
| 6 | 4 | 4 |
| 100 | 33 | 35 |
| 200 | 54 | 59 |
| 300 | 72 | 77 |
| 600 | 117 | 127 |

The results in Table 1 illustrate that our polymers are stable in acid and are also stable at the high shear rates of 600 rpm in acid media.

EXAMPLE 2

The acid heat stability and calcium carbonate compatibility of a high molecular weight polymer of 2-acrylamido-2-methylpropane sulfonic acid was tested as follows. 250 milligrams per liter and 500 milligrams per liter polymer solutions in 15 percent hydrochloric acid were prepared. One portion of each of these solutions was heated to 200° F. and stored for 24 hours. No precipitate or turbidity resulted after 24 hours in the heated acidic solution. To another portion of the polymer solutions was added sufficient calcium carbonate to make the final solution 5,000 milligrams per liter $CaCO_3$. These acidic polymer/carbonate solutions were held at room temperature for 24 hours and then at 200° F. for an additional 24 hours. No precipitate or turbidity resulted after the 48 hours. This example illustrates the compatibility of 2-acrylamido-2-methyl-propane sulfonic acid polymers in acidic solutions and acidic brine solutions.

EXAMPLE 3

A series of polymers containing 2-acrylamido-2-methylpropane sulfonic acid were evaluated as friction reducers under fresh water, fresh water with additional shear, and high calcium brine conditions. For the fresh water evaluation, 2.4 grams of the polymer was added to 10 liters of water in the standard friction loop and the percent friction reduction results were recorded for 10 minutes. For the fresh water with additional shear evaluation, a Dispersator with a simplex head was turned on and under high shear conditions the percent friction reduction was recorded for an additional 10 minutes. For the high calcium brine test, 2.4 grams of the polymer was added to 10 liters of 2 percent calcium chloride brine in the standard friction loop and the percent friction reduction recorded for 10 minutes. The results are shown in Tables 2 and 3.

TABLE 2

Fresh Water and Fresh Water Shear

| Composition AS/AM | Percent FR 30 sec. | 5 min. | 10 min. | 15 min. | 20 min. |
|---|---|---|---|---|---|
| 100/0 | 58.5 | 59.0 | 59.0 | 52.7 | 46.2 |
| 51/49 | 56.5 | 57.0 | 57.0 | 56.5 | 55.5 |
| 2.5/97.5 | 58.5 | 57.0 | 56.3 | 42.4 | 35.5 |
| 35/65 | 60.8 | 58.3 | 58.0 | 57.0 | 55.7 |
| 25/75 | 54.8 | 56.5 | 56.7 | 56.7 | 55.5 |
| 15/85 | 55.2 | 57.0 | 56.8 | 56.6 | 55.5 |
| 10/90 | 58.6 | 58.6 | 58.5 | 58.5 | 57.7 |
| 5/95 | 56.8 | 55.7 | 55.5 | 51.7 | 46.2 |

TABLE 3

$Ca^{++}$ Brine

| Composition AS/AM | Percent FR 30 sec. | 5 min. | 10 min. |
|---|---|---|---|
| 100/0 | 58.5 | 58.7 | 57.5 |
| 51/49 | 58.2 | 59.0 | 58.8 |
| 2.5/97.5 | 58.5 | 57.2 | 54.0 |
| 35/65 | 58.0 | 57.5 | 57.9 |
| 25/75 | 57.5 | 57.3 | 57.2 |
| 15/85 | 58.0 | 58.0 | 57.0 |
| 10/90 | 57.0 | 57.0 | 55.8 |
| 5/95 | 56.0 | 55.0 | 52.5 |

The data presented in Tables 2 and 3 illustrate that our polymers are effective in fresh water and in high calcium brines. A comparison of the first three columns in Table 2 with Table 3 clearly illustrates the effectiveness of our compounds in brine. In addition, Table 2 shows that our polymers are shear stable.

EXAMPLE 4

A series of polymers containing 2-acrylamido-2- methylpropane sulfonic acid were tested for their friction-reducing properties in fresh water at feed rates of 1 pound/1,000 gallons (1.2 grams/10 liters) and 2 pounds/1,000 gallons (2.4 grams/10 liters). In addition, these tests included 10 minutes of vigorous stirring and an additional 10 minutes of high speed shear. The initial friction reduction (30 seconds), the final friction reduction after 20 minutes and the drop in friction reduction during the shear (10 minute) period (ΔS) were recorded. The results are shown in Table 4.

EXAMPLE 6

Viscosity tests were run on a series of polymers using a Fann Model 35 Viscosometer. The aqueous systems used were distilled water, tap water, 1 percent NaCl, 10 percent NaCl, 1 percent KCl, 100 milligrams per liter $Ca^{++}$, 2 percent $CaCl_2$ and 15 percent HCl. The concentration of the polymer was 2.4 grams per liter and 4.8 grams per liter. The results for a shear rate of 100 rpm are shown in Table 6.

TABLE 6

Viscosity at 100 r.p.m.

| Composition AS/AM | 2.4 grams/liter | | | | | | | 4.8 grams/liter | |
|---|---|---|---|---|---|---|---|---|---|
| | Distilled water | Tap water | 1% NaCl | 10% NaCl | 1% KCl | 100 p.p.m. $Ca^{++}$ | 2% $CaCl_2$ | 15% HCl | 15% HCl after 24 hours |
| 2.5/97.5 | 21.6 | 12.6 | 8.4 | 9.6 | | 10.2 | 9.0 | 21.6 | 21.6 |
| 5.0/95 | 31.2 | 18.6 | 9.0 | 9.6 | 9.0 | 11.4 | 7.8 | 19.8 | 19.2 |
| 10/90 | 31.2 | 15.0 | 10.4 | 9.6 | 10.8 | 13.4 | 7.8 | 19.3 | 19.3 |
| 15/85 | 48.0 | 30.6 | 13.2 | 10.8 | 12.0 | 21.0 | 9.0 | 19.2 | 19.2 |
| 25/75 | 49.2 | | 13.8 | 10.4 | 15.0 | 27.6 | 9.0 | 17.4 | 18.0 |
| 35/65 | 48.0 | 35.4 | 14.4 | 10.8 | 10.8 | 28.2 | 10.2 | 15.6 | 16.2 |
| 51/49 | 43.2 | 30.6 | 13.8 | 10.2 | 13.8 | 25.8 | 9.0 | 15.0 | 16.2 |
| 60/40 | 42.5 | | 12.6 | 9.0 | 13.2 | 24.6 | 7.8 | 13.2 | 13.8 |
| 70/30 | 39.5 | | 12.0 | 7.8 | 12.6 | 21.4 | 7.2 | 12.0 | 12.6 |
| 80/20 | 37.2 | 30.6 | 12.0 | 8.4 | 12.6 | 24.6 | 7.2 | 12.0 | 13.2 |
| 90/10 | 33.0 | 27.0 | 11.4 | 7.8 | 11.4 | 22.2 | 7.2 | 12.0 | 12.0 |
| 100/0 | 28.2 | 24.0 | 9.0 | 6.6 | 9.0 | 19.8 | 5.4 | 9.6 | 10.2 |
| FR-16 | 58.2 | 43.2 | 13.8 | 9.0 | 15.0 | 28.2 | 5.4 | 6.0 | 3.0 |

TABLE 4

Percent FR at Various Polymer Concentrations

| Composition AS/AM | 1 lb./1,000 gal. FW/S | | | 2 lbs./1,000 gal. FW/S | | |
|---|---|---|---|---|---|---|
| | 30 sec. | 20 min. | Δ/S | 30 sec. | 20 min. | Δ/S |
| 2.5/97.5 | 58.0 | 33.0 | 20.0 | 58.5 | 35.5 | 20.8 |
| 5/95 | 56.7 | 39.8 | 16.0 | 56.8 | 46.2 | 9.3 |
| 10/90 | 57.0 | 51.0 | 7.2 | 58.6 | 57.7 | 0.8 |
| 15/85 | 57.0 | 54.0 | 4.5 | 55.2 | 55.5 | 1.3 |
| 25/75 | 58.2 | 45.0 | 14.2 | 54.8 | 55.5 | 1.2 |
| 35/65 | 58.0 | 42.0 | 17.0 | 60.8 | 55.7 | 2.3 |
| 51/49 | 59.0 | 43.0 | 16.0 | 56.5 | 56.5 | 0.5 |
| 60/40 | 57.5 | 40.0 | 18.0 | 56.0 | 55.0 | 2.0 |
| 70/30 | 54.0 | 39.0 | 19.0 | 56.5 | 53.4 | 4.2 |
| 80/20 | 55.6 | 35.0 | 20.0 | 54.0 | 50.2 | 5.8 |
| 90/10 | 55.5 | 30.0 | 23.2 | 55.7 | 48.0 | 8.5 |
| 100/0 | 53.5 | 25.8 | 21.2 | 57.5 | 41.0 | 14.5 |
| FR-16 | 56.8 | 40.0 | 17.5 | 56.0 | 51.5 | 6.0 |

In the tables, FR-16 is a commercially available polymeric friction reducer made in accordance with U. S. Pat. No. 3,562,226.

EXAMPLE 5

A series of polymers containing 2-acrylamido-2-methylpropane sulfonic acid were tested for their friction-reduction properties in 10 percent sodium chloride brine and 2 percent calcium chloride brine. The feed rate was 2 pounds/1,000 gallons (2.4 grams/10 liters) and the test included an additional 10 minutes of high speed shear as described in Example 4 above. The results are shown in Table 5.

TABLE 5

Percent FR in NaCl and CaCl

| Composition AS/AM | 2 lbs./1,000 gal. 10% NaCl/S | | | 2 lbs./1,000 gal. 2% $CaCl_2$ | | |
|---|---|---|---|---|---|---|
| | 30 sec. | 20 min. | Δ/S | 30 sec. | 10 mm. | Δ/10 |
| 2.5/97.5 | 55.5 | 40.0 | 15.0 | 58.5 | 54.0 | 4.5 |
| 5.0/95 | 56.0 | 41.5 | 13.0 | 56.0 | 52.5 | 3.5 |
| 10/90 | 57.0 | 45.2 | 12.0 | 57.0 | 55.5 | 1.5 |
| 15/85 | 57.2 | 50.5 | 6.5 | 55.0 | 53.0 | 2.0 |
| 25/75 | 57.0 | 48.0 | 10.0 | 55.5 | 51.5 | 1.0 |
| 35/65 | 57.5 | 47.0 | 10.5 | 56.0 | 55.2 | 0.8 |
| 51/49 | 56.0 | 45.7 | 11.0 | 54.5 | 55.5 | +1.0 |
| 60/40 | 56.8 | 46.5 | 11.3 | 56.8 | 57.0 | +0.2 |
| 70/30 | 55.2 | 46.0 | 10.4 | 56.0 | 56.0 | 0 |
| 80/20 | 55.5 | 45.5 | 10.5 | 55.6 | 54.5 | 1.1 |
| 90/10 | 55.8 | 40.5 | 15.5 | 56.0 | 55.0 | 1.0 |
| 100/0 | 56.5 | 34.5 | 18.5 | 55.5 | 50.5 | 5.0 |
| FR-16 | 57.5 | 46.0 | 11.8 | 55.0 | 45.0 | 10.0 |

The data presented in Table 6 illustrates the effectiveness of our compounds in fresh water, various brine concentrations and acids. In addition, it shows the excellent stability of the polymers in highly concentrated acid solutions.

EXAMPLE 7

A series of polymers containing 2-acrylamido-2-methylpropane sulfonic acid, acrylamide and acrylic acid (carboxyl) were prepared by copolymerizing 2-acrylamido-2-methylpropane sulfonic acid with acrylamide and then hydrolyzing the resulting copolymer so that the final polymer had the desired amount of carboxyl functionality. These polymers were then evaluated in standard friction reduction tests at concentrations of 2 pounds/1,000 gallons (2.4 grams/10 liters). They were evaluated in fresh water, 10 percent NaCl brine, and 2 percent CaCl brine. In addition, the fresh water and NaCl test solutions were dispersated an additional 10 minutes to test the shear stability (ΔS) of the carboxyl containing polymers. The results are shown in Tables 7, 8, and 9.

TABLE 7

2 lbs./1,000 gals. Fresh Water with Shear

| Composition AM/AS | Mole % Hydrolysis | % Friction Reduction | | Δ/S |
|---|---|---|---|---|
| | | 10 min. | 20 min. | |
| 85/15 | 0 | 52.5 | 44.0 | 8.5 |
| 85/15 | 10 | 53.0 | 49.0 | 4.0 |
| 85/15 | 20 | 54.0 | 49.5 | 4.5 |
| 85/15 | 30 | 54.0 | 48.5 | 5.5 |
| 90/10 | 0 | 53.5 | 45.0 | 8.5 |
| 90/10 | 10 | 53.5 | 45.5 | 8.0 |
| 90/10 | 20 | 52.5 | 44.5 | 8.0 |
| 90/10 | 30 | 51.5 | 43.5 | 8.0 |
| 75/25 | 0 | 54.0 | 49.5 | 5.0 |
| 75/25 | 10 | 54.5 | 50.5 | 4.0 |
| 75/25 | 20 | 54.5 | 50.0 | 4.5 |
| 75/25 | 30 | 54.5 | 50.0 | 4.5 |

TABLE 8

2 lbs./1,000 gals. 10% NaCl with Shear

| Composition AM/AS | Mole % Hydrolysis | % Friction Reduction | | Δ/S |
|---|---|---|---|---|
| | | 10 Min. | 20 Min. | |
| 85/15 | 0 | 47.5 | 33.0 | 16.5 |

| Composition | Mole % | % Friction Reduction | | |
|---|---|---|---|---|
| | Hydrolysis | 5 min. | | |
| 85/15 | 10 | 56.5 | 44.0 | 12.5 |
| 85/15 | 20 | 56.0 | 43.0 | 13.0 |
| 85/15 | 30 | 55.5 | 44.0 | 11.5 |
| 90/10 | 0 | 52.5 | 38.5 | 14.0 |
| 90/10 | 10 | 50.0 | 38.5 | 12.0 |
| 90/10 | 20 | 52.0 | 39.0 | 13.0 |
| 90/10 | 30 | 52.0 | 40.0 | 12.0 |
| 75/25 | 0 | 56.0 | 44.0 | 12.0 |
| 75/25 | 10 | 55.5 | 44.5 | 11.0 |
| 75/25 | 20 | 57.0 | 44.0 | 13.0 |
| 75/25 | 30 | 57.5 | 46.0 | 11.5 |

TABLE 9

2 lbs./1,000 gals. 2% $CaCl_2$

| Composition AM/AS | Mole % Hydrolysis | % Friction Reduction 5 min. | 10 min. |
|---|---|---|---|
| 85/15 | 0 | 54.0 | 52.5 |
| 85/15 | 10 | 57.0 | 56.0 |
| 85/15 | 20 | 59.0 | 57.0 |
| 85/15 | 30 | 57.0 | 55.0 |
| 90/10 | 0 | 56.0 | 53.5 |
| 90/10 | 10 | 51.0 | 50.0 |
| 90/10 | 20 | 50.5 | 48.5 |
| 90/10 | 30 | 45.5 | 43.5 |
| 75/25 | 0 | 59.0 | 58.0 |
| 75/25 | 10 | 58.0 | 56.5 |
| 75/25 | 20 | 57.5 | 56.5 |
| 75/25 | 30 | 58.5 | 57.5 |

The results shown in Tables 7, 8, and 9 illustrate that the polymers of our invention containing carboxyl groups are very effective friction reducers and have excellent shear stability.

We claim:

1. An improved process for hydraulically fracturing an earth formation penetrated by a well comprising injecting an aqueous fracturing fluid down the well into the earth formation under pressure to cause fracturing of the earth formation wherein the improvement comprises treating the aqueous fracturing fluid prior to injection with an effective amount of a random, linear, water-soluble polymer consisting essentially of units represented by the formula:

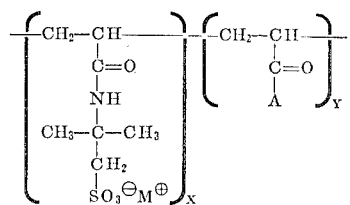

where "$M^+$" is selected from the group consisting of hydrogen, ammonium, and alkali metals; "A" is $-NH_2$ or $-O^- M^+$ with at least 50 percent of the "A" groups being $-NH_2$; "X" is from about 2.5 mole percent to 100 mole percent and "Y" is from 0 to about 97.5 mole percent.

2. An improved process for hydraulically fracturing an earth formation penetrated by a well comprising injecting an aqueous fracturing fluid down the well into the earth formation under pressure to cause fracturing of the earth formation wherein the improvement comprises treating the aqueous fracturing fluid prior to injection with an effective amount of a random, linear, water-soluble polymer consisting essentially of from about 2.5 to 100 mole percent 2-acrylamido-2-methylpropane sulfonic acid and from 0 to about 97.5 mole percent acrylamide.

3. A method of claim 2 wherein the amount of polymer employed is about 50 to 1,000 ppm by weight based on the weight of the aqueous fracturing fluid.

4. A method of claim 2 wherein the polymer has a molecular weight of at least about 1,000,000.

5. A method of claim 3 wherein the polymer has a molecular weight of at least about 1,000,000.

* * * * *